United States Patent [19]

Akutagawa et al.

[11] 4,346,399

[45] Aug. 24, 1982

[54] COLOR TEMPERATURE CONTROL CIRCUIT

[75] Inventors: Touru Akutagawa, Irima; Takashi Okada; Yutaka Tanaka, both of Yokohama, all of Japan

[73] Assignee: Sony Corporation, Tokyo, Japan

[21] Appl. No.: 231,438

[22] Filed: Feb. 4, 1981

[30] Foreign Application Priority Data

Feb. 8, 1980 [JP] Japan .................................. 55-15364

[51] Int. Cl.$^3$ ............................................ H04N 9/535
[52] U.S. Cl. .......................................... 358/29; 358/65
[58] Field of Search .............................. 358/29, 32, 65

[56] References Cited

U.S. PATENT DOCUMENTS 4,127,868 11/1978 Nagaoka et al. ...................... 358/29

OTHER PUBLICATIONS

"Switching circuit gives whiter white and truer colors on TV screen", *Electronics*, vol. 50, No. 17, Aug. 18, 1977, pp. 7E-8E.

Primary Examiner—John C. Martin
Attorney, Agent, or Firm—Hill, Van Santen, Steadman, Chiara & Simpson

[57] ABSTRACT

A color temperature control circuit for a color television receiver having a color decoder circuit supplied with a composite video signal and for generating red, green and blue primary color signals at its output terminals, a video output circuit for amplifying the three primary color signals, a tri-color cathode ray tube having three control electrodes adapted to receive the three primary color signals from the video output circuit, and a circuit arrangement connected between the color decoder circuit and the video output circuit, in which the circuit arrangement has the same transfer function for all three primary color signals when the input signals are below a predetermined level and a transfer function for the blue primary color signal larger than that for the red primary color signal when input signal levels of the blue and red primary color signals are larger than the predetermined level.

4 Claims, 7 Drawing Figures

COLOR TEMPERATURE CONTROL CIRCUIT

BACKGROUND OF THE INVENTION

1. Field of the Invention

The present invention relates generally to a color temperature control circuit for a color television receiver, and is directed more particularly to a color temperature control circuit for a color television receiver in which the blue primary color voltage is made larger than the red primary color voltage when the ratio between an output by an input is nearer the white level more than a certain level.

2. Description of the Prior Art

In order to reproduce an image on a color television receiver with the complete color fidelity and also beautiful white color at the white peak, it is necessary that the reference white of the television receiver (cathode ray tube) is made different between the time when the luminance level of a video signal is low and the time when the luminance level is high. For example, it is desired that at a level lower than the flesh color level, a color temperature is held at 9300° K.+8 MPCD (minimum perceptible color difference) while made at 14000° K.+8MPCD at the white peak level.

In the art there has been proposed an apparatus to control the color temperature of a cathode ray tube as shown in FIG. 1. In this prior art control apparatus, red, green and blue primary color signal voltages R, G and B derived from a color decoder 10 are respectively supplied through a video output circuit 20 and through red, green and blue cathode resistors $R_R$, $R_G$ and $R_B$ to control electrodes or cathodes $K_R$, $K_G$ and $K_B$ of a tri-color cathode ray tube 30. In this case, a series connection of a zener diode $Z_G$ and a resistor $r_G$ is connected in parallel to the green cathode resistor $R_G$ and a series connection of a zener diode $Z_B$ and a resistor $r_B$ is also connected in parallel to the blue cathode resistor $R_B$. Accordingly, when the green and blue cathode currents increase, the zener diodes $Z_G$ and $Z_B$ become each conducted, and hence the green and blue cathode feedback resistances are reduced from $R_G$ and $R_B$ to $R_G//r_G$ and $R_B//r_B$ respectively. Thus, the green and blue feedback amounts decrease, and the green and blue drive currents increase whereby the color temperature becomes high.

In this case, however, the feedback resistance is the sum of the output impedance of the video output circuit 20 and the above resistance. Therefore, even if the resistances are varied from $R_G$ and $R_B$ to $R_G//r_G$ and $R_B//r_B$, the variation of the feedback resistance is less. For this reason, the color temperature is less in variation and hence it is rather difficult that a desired color temperature is presented at a white peak level as indicated by a solid line 1 in the graph of FIG. 2, and the color temperature is insufficient as indicated by a dotted-line 2 in the graph of FIG. 2. If the feedback resistance is varied at a lower luminance level to thereby vary the color temperature, the desired color temperature can be obtained at the white peak level as indicated by a dotted-line 3 in the graph of FIG. 2. However, in order to reproduce the color with high fidelity, it is necessary that the color temperature is kept at a low temperature until the flesh color level. Therefore, the above measure is not so desired.

Another meansure is also proposed, by which the series connections of the zener diodes $Z_G$, $Z_B$ and resistors $r_G$, $r_B$ shown in FIG. 1 are not used but the resistance values of the cathode resistors $R_R$, $R_G$ and $R_B$ themselves are made different as $R_R>R_G>R_B$. This measure proposes the defect similar to the former measure. In addition, it is not desired to select the resistance values of the resistors $R_G$, $R_B$ low in view of protecting the video output circuit 20 from the discharge in the cathode ray tube 30. Further, when the differences among the resistance values of the resistors $R_R$, $R_G$, $R_B$ are large, the frequency characteristics among the red, green and blue primary colors do not coincide, the pulse characteristic is deteriorated and a color smear is generated.

OBJECTS AND SUMMARY OF THE INVENTION

Accordingly, an object of the present invention is to provide a novel color temperature control circuit for a color television receiver free from the defect encountered in the prior art.

Another object of the invention is to provide a color temperature control circuit for a color television receiver which can control the color temperature to be a desired characteristic without the prior art defect.

According to an aspect of the present invention, a color temperature control circuit for a color television receiver is provided which comprises:

(A) a color decoder circuit supplied with a composite video signal and for generating red, green and blue primary color signals at its outputs;

(B) a video output circuit for amplifying said three primary color signals;

(C) a tri-color cathode ray tube having three control electrodes adapted to receive said three primary color signals from said video output circuit; and (D) a circuit arrangement connected between said color decoder circuit and said video output circuit, said circuit arrangement having the same transfer function for all three primary color signals when the input signals are below a predetermined level and having transfer function for the blue primary color signal large than that for the red primary color signal when input signal levels of said blue and red primary color signals are larger than said predetermined level.

The other objects, features and advantages of the present invention will become apparent from the following description taken in conjunction with the accompanying drawings through which the like references designate the same elements and parts.

DESCRIPTION OF THE PREFERRED EMBODIMENT

Figure 1:
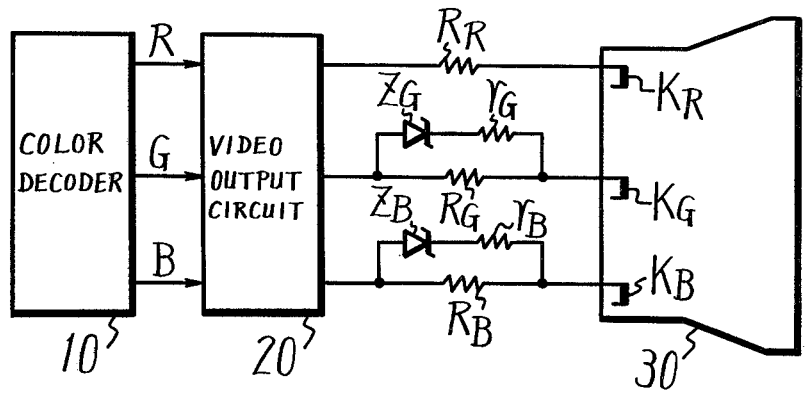
FIG. 1 is a connection diagram showing partially in block a prior art color temperature control apparatus for use with a color television receiver.
Figure 2:
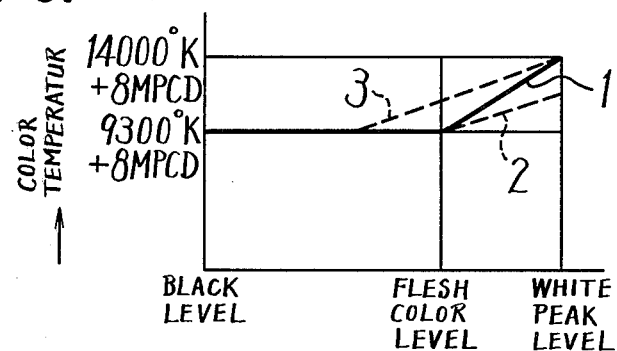
FIG. 2 is a graph used to explain the apparatus shown in FIG. 1.
Figure 3:
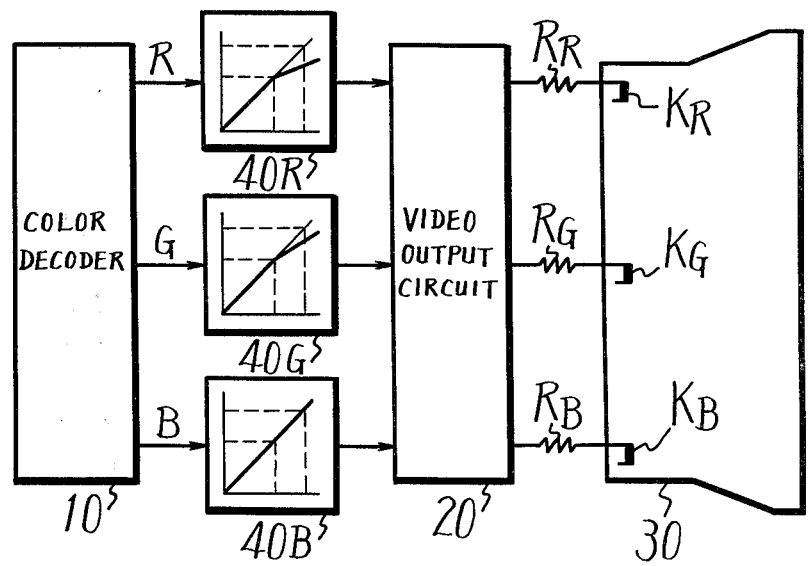
FIG. 3 is a systematic diagram showing partially in block the fundamental construction of the color temperature control circuit for a color television receiver according to the present invention.

FIG. 3 shows the theoretical construction of the color temperature control circuit for a color television receiver according to the present invention in which the references same as those used in FIG. 1 designate the same elements and parts. According to the invention, although the red, green and blue primary color signal voltages R, G and B delivered from the color decoder 10 are respectively supplied through the video output circuit 20 and through the cathode resistors $R_R$, $R_G$ and $R_B$ to the control electrodes or cathodes $K_R$, $K_G$ and $K_B$ of the tri-color cathode ray tube 30, non-linear and linear circuits 40R, 40G and 40B are respectively inserted between the color decoder 10 and the video output circuit 20.

Figure 5:
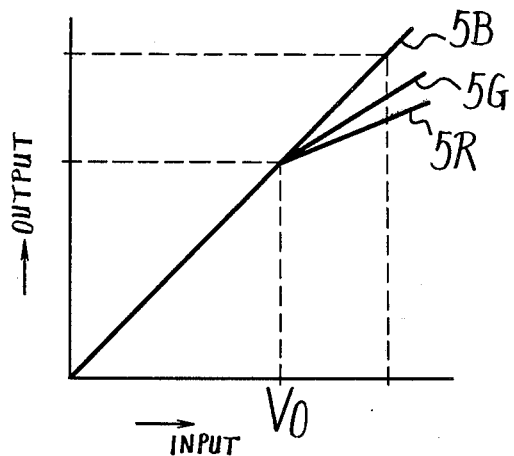
FIGS. 5 to 7 are respectively graphs showing the characteristics of various cases of the invention.

In this case, the circuit 40B which is inserted into the blue primary color signal voltage line is a linear circuit which is so formed that the ratio between its output by its input becomes a constant value $G_O$ regardless of the input level thereto as indicated by a straight line 5B in the graph of FIG. 5; the circuit 40G which is inserted into the green primary color signal voltage line is a non-linear circuit which is so formed that the ratio between its output and input becomes $G_O$ when its input level is lower than a certain level $V_O$ while becomes a value $G_L$ lower than the value $G_O$ when the input level is higher than $V_O$ as indicated by a bent line 5G in the graph of FIG. 5; and the circuit 40R which is inserted into the red primary color signal voltage line is also a non-linear circuit which is so formed that the ratio between its output and input becomes $G_O$ when its input level is lower than the level $V_O$ while becomes a value $G_{LL}$ lower than the value $G_L$ when the input level is higher than $V_O$ as indicated by a bent line 5R in the graph of FIG. 5.

Accordingly, with the construction of the invention shown in FIG. 3, when the red and green primary color signal voltages become both higher than the level $V_O$, the red and green primary color signal voltages are both compressed and hence the blue primary color signal voltage is relatively expanded with the result that the blue drive current increases to make the color temperature high. Thus, by selecting the level $V_O$, the color temperature of 9300° K.+8MPCD is kept in the range lower than the flesh color level, while by selecting the above values $G_L$ and $G_{LL}$ the color temperature of 14,000° K.+8 MPCD can be presented at the white peak level.

In this case, the video output circuit 20 is formed of an SEPP (single-ended push-pull) circuit and so on and the output impedance thereof is selected as a low impedance smaller than such as several hundred Ω to provide a linear output.

Figure 4:
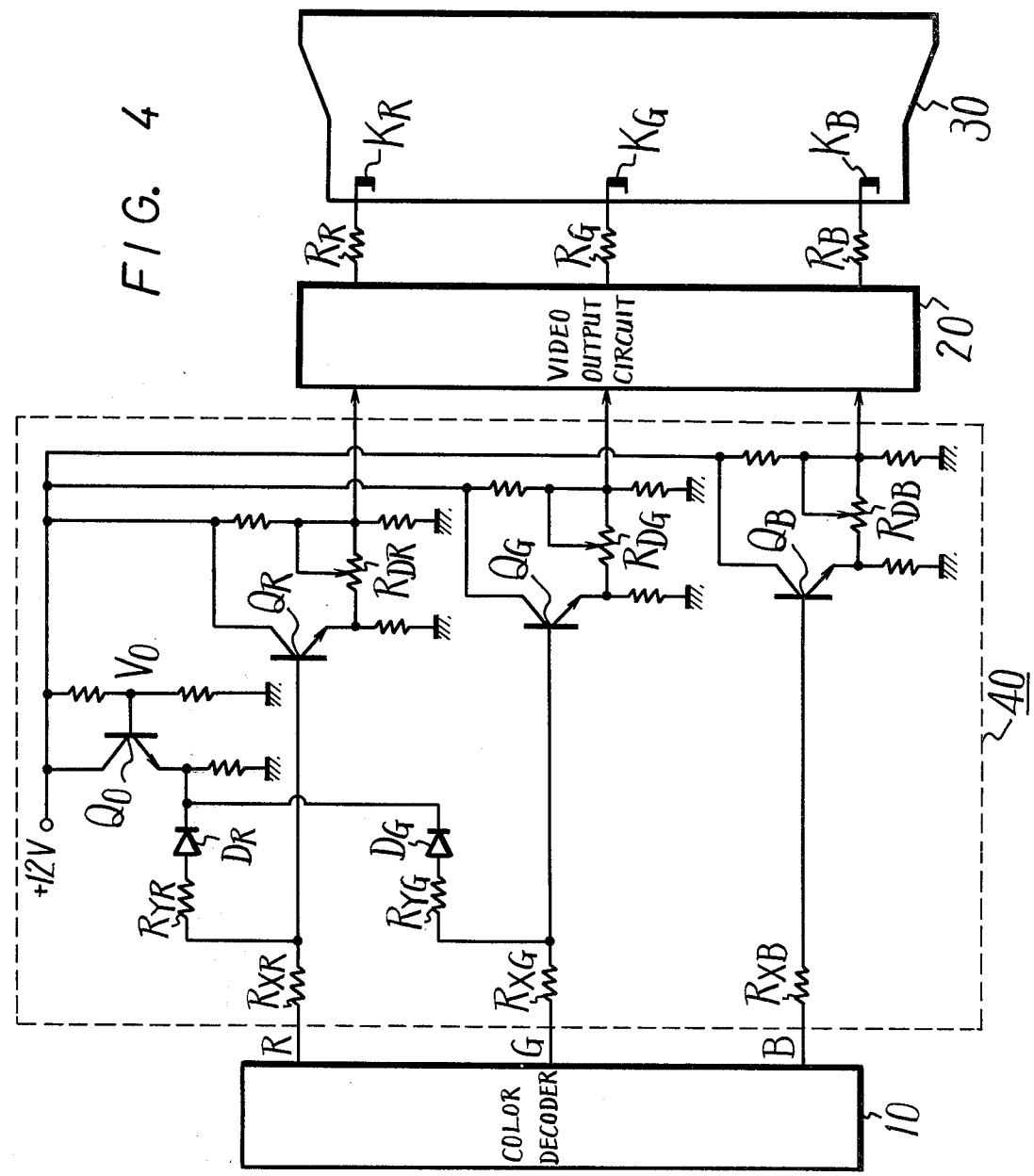
FIG. 4 is a connection diagram showing a practical example of the invention.

FIG. 4 shows a practical example of the circuit construction shown in FIG. 3 in which 40 designates generally the circuits 40R, 40G and 40B described above.

In the example of the invention shown in FIG. 4, the red, green and blue primary color signal voltages R, G and B delivered from the color decoder 10 are respectively applied through resistors $R_{XR}$, $R_{XG}$ and $R_{XB}$, the base-emitter paths of transistors $Q_R$, $Q_G$ and $Q_B$, and through volumes (variable resistors) $R_{DR}$, $R_{DG}$ and $R_{DB}$ for the drive amount adjustment to the video output circuit 20. The bases of the transistors $Q_R$ and $Q_G$ are connected together through a series connection of a resistor $R_{YR}$ and a diode $D_R$ and a series connection of a resistor $R_{YG}$ and a diode $D_G$ to the emitter of a transistor $Q_O$ whose base is supplied with the voltages $V_O$.

Accordingly, with the example of the invention shown in FIG. 4, when the red and green primary color signal voltages R and G become higher than the voltage or level $V_O$, the diodes $D_R$ and $D_G$ turn ON. Thus, the red and green primary color signal voltages R and G are respectively compressed at the ratios of $R_{YR}/(R_{XR}+R_{YR})$ and $R_{YG}/(R_{XG}+R_{YG})$ so that the blue primary color signal voltage B is relatively expanded.

Figure 6:
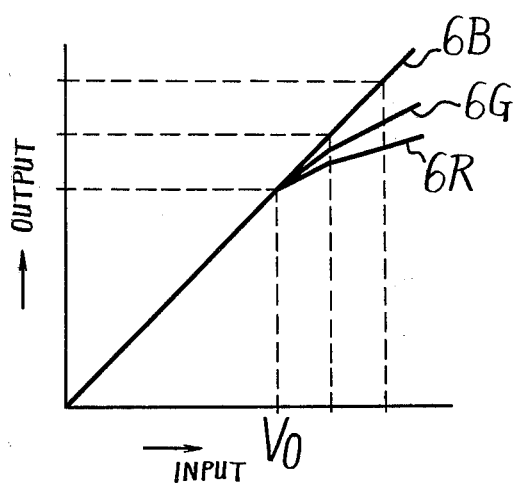

In the example of FIG. 4, the circuit for the blue primary color signal voltage B is formed to be a linear circuit with the characteristic as indicated by a straight line 6B in the graph of FIG. 6, while the circuits for the green and red primary color signal voltages G and R are respectively formed to be non-linear circuits with such characteristics that when the input levels thereto are higher than the level $V_O$, the ratios between their outputs by the inputs thereof are changed at plural stages to be approximated in curve as indicated by bent lines 6G and 6R in the graph of FIG. 6.

If the circuit corresponding to the transistor $Q_O$ is provided plural, it may be possible to present the above characteristics.

Figure 7:
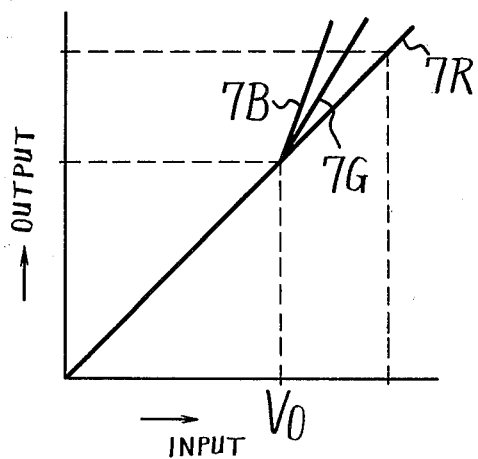

Further, the circuit for the red primary color signal voltage is a linear circuit which is so formed that the ratio between its output by its input becomes the constant value $G_O$ regardless of the input level thereto as indicated by a straight line 7R in the graph of FIG. 7; the circuit for the green primary color signal voltage is a non-linear circuit which so formed that the ratio between its output and input becomes $G_O$ when its input level is lower than the level $V_O$ while becomes a value $G_H$ higher than the value $G_O$ when the input level is higher than $V_O$ as indicated by a bent line 7G in the graph of FIG. 7; and the circuit for the blue primary color signal voltage is also a non-linear circuit which is so formed that the ratio between its output and input becomes $G_O$ when its input level is lower than the level $V_O$ while becomes a value $G_{HH}$ higher than the value $G_H$ when the input level is higher than $V_O$ as indicated by a bent line 7B in the graph of FIG. 7.

Since according to the invention in order to increase the color temperature high it is sufficient to increase the blue drive current, it may be enough that the circuit for the green primary color signal voltage is same as that of the circuit for the red primary color signal voltage in characteristic.

As described above, according to the present invention, the color temperature can be controlled to be of a desired characteristic and it is needless to select the resistance values of the cathode resistors small, so that no problem is introduced in view of the countermeasure for the discharge of the color cathode ray tube.

Further, according to the invention, due to the fact that the cathode resistors can be selected equal in resistance value, such a defect can be avoided that the frequency characteristics can not be coincided among the red, green and blue colors and hence the pulse characteristic is deteriorated.

It will be apparent that many modifications and variations could be effected by one skilled in the art without departing from the spirits or scope of the novel concepts of the present invention so that the spirits or scope of the invention should be determined by the appended claims only.

We claim as our invention:

1. A color temperature control circuit for a color television receiver, comprising:
   (A) a color decoder circuit supplied with a composite video signal and for generating red, green and blue primary color signals at its outputs;
   (B) a video output circuit for amplifying said three primary color signals;
   (C) a tri-color cathode ray tube having three control electrodes adapted to receive said three primary color signals from said video output circuit; and
   (D) a circuit arrangement connected between said color decoder circuit and said video output circuit, said circuit arrangement having the same transfer function for all three primary color signals when the input signals are below a predetermined level and having a transfer function for the blue primary color signal larger than that for the red primary color signal when input signal levels of said blue and red primary color signals are larger than said predetermined level.

2. A color temperature control circuit according to claim 1, wherein said circuit arrangement has the transfer function for the green primary signal between those of the blue and red primary color signals when three primary color signals are larger than said predetermined level.

3. A color temperature control circuit according to claim 1, wherein said circuit arrangement comprises a switching circuit in a red primary color signal channel, said switching circuit being conductive when an input red primary color signal is larger than the predetermined level so that the transfer function for the red primary color signal decreases.

4. A color temperature control circuit according to claim 3, wherein said switching circuit is a diode one terminal of which is connected to the voltage source corresponding to said predetermined level.

* * * * *